(12) United States Patent
Eager

(10) Patent No.: US 12,092,000 B2
(45) Date of Patent: Sep. 17, 2024

(54) DETERMINING AN ESTIMATE OF SOOT LOAD IN A DIESEL PARTICULATE FILTER USING A RADIO FREQUENCY SENSOR

(71) Applicant: Perkins Engines Company Limited, Peterborough (GB)

(72) Inventor: Antony J. Eager, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 436 days.

(21) Appl. No.: 17/601,770

(22) PCT Filed: Apr. 7, 2020

(86) PCT No.: PCT/EP2020/025164
§ 371 (c)(1),
(2) Date: Oct. 6, 2021

(87) PCT Pub. No.: WO2020/207628
PCT Pub. Date: Oct. 15, 2020

(65) Prior Publication Data
US 2022/0195909 A1    Jun. 23, 2022

(30) Foreign Application Priority Data

Apr. 12, 2019   (GB) ...................................... 1905247

(51) Int. Cl.
*F01N 11/00*       (2006.01)
*F01N 3/021*       (2006.01)
*G01N 22/00*       (2006.01)

(52) U.S. Cl.
CPC .............. *F01N 11/00* (2013.01); *F01N 3/021* (2013.01); *G01N 22/00* (2013.01); *F01N 2550/04* (2013.01)

(58) Field of Classification Search
CPC ...... F01N 11/00; F01N 3/021; F01N 2550/04; F01N 9/002; G01N 22/00
See application file for complete search history.

(56) References Cited

U.S. PATENT DOCUMENTS 8,283,930 B2    10/2012   Davenport
9,399,185 B2     7/2016   Bromberg
(Continued)

FOREIGN PATENT DOCUMENTS

DE    102017209521 B3    6/2018
WO       2010074812 A1    7/2010

OTHER PUBLICATIONS

NPL #XP000277372; "Measuring Diesel Partiuclate in Filters"; vol. 100, No. 6; Automotive Engineering; Warrendale, PA, USA.
(Continued)

*Primary Examiner* — Timothy A Brainard
*Assistant Examiner* — Kenneth W Good

(57) ABSTRACT

The disclosed method involves using a radio frequency sensor to estimate soot load in a diesel particulate filter. An engine control module receives a first mean attenuation value derived from attenuation values for a set of radio frequencies within a specific band detected by the sensor. Additionally, first standard deviation data related to the mean attenuation value is received. The method determines whether this standard deviation data exceeds a predefined threshold. If not, the first mean attenuation value is used to infer the soot load. If the standard deviation data threshold is exceeded, a second mean attenuation value from a different set of radio frequencies within another band is obtained. Similarly, second standard deviation data is received. If the second standard deviation data does not exceed the threshold, the second mean attenuation value is used to infer the soot load.

14 Claims, 5 Drawing Sheets

(56) References Cited

U.S. PATENT DOCUMENTS

| | | |
|---|---|---|
| 2007/0024289 A1 | 2/2007 | Knitt |
| 2010/0049462 A1* | 2/2010 | Krafthefer .............. F01N 9/002 |
| | | 60/276 |
| 2010/0101409 A1 | 4/2010 | Bromberg |
| 2011/0074440 A1* | 3/2011 | Davenport ............. G01N 22/00 |
| | | 324/641 |
| 2012/0158242 A1 | 6/2012 | Snopko |
| 2012/0159929 A1* | 6/2012 | Snopko ................... F01N 9/002 |
| | | 60/311 |
| 2012/0204537 A1 | 8/2012 | Dea |
| 2012/0291419 A1 | 11/2012 | Snopko |
| 2017/0211453 A1 | 7/2017 | Sappok |
| 2018/0003532 A1* | 1/2018 | Vanberg ................. F28F 19/00 |
| 2018/0137695 A1 | 5/2018 | Sappok |

OTHER PUBLICATIONS

PCT Search Report related to PCT/EP2020/025164; reported on May 27, 2020.
GB Search Report related to Great Britain Application No. 1905247.1; reported on Oct. 7, 2019.

* cited by examiner

DETERMINING AN ESTIMATE OF SOOT LOAD IN A DIESEL PARTICULATE FILTER USING A RADIO FREQUENCY SENSOR

This patent application is a 35 USC § 371 U.S. national stage of International Application No. PCT/EP2020/025164 filed on Apr. 7, 2020, which claims the benefit and priority of Great Britian Application No. 1905247.1 filed on Apr. 12, 2019, the disclosures of which are incorporated in their entirety by reference herein.

FIELD OF THE DISCLOSURE

The disclosure relates to the field of measuring soot, for example in a diesel particulate filter, using radio frequency (RF) sensing.

BACKGROUND

It is known to use a radio frequency sensor to sense soot loading in a diesel particulate filter. Such arrangements make use of a radio frequency sensor that comprises a radio frequency transmitter and a radio frequency receiver. Radio frequency waves are transmitted across a frequency sweep by the transmitter into the diesel particulate filter. The receiver receives the radio frequency waves once influenced by passage through the diesel particulate filter. Soot in the diesel particulate filter influences the radio frequency waves during their passage through the diesel particulate filter. The radio frequency waves received by the receiver are then interpreted to determine an extent of soot loading within the diesel particulate filter.

Generally, a processor—potentially a constituent of an engine management system—receives raw radio frequency data from the sensor and interprets that data in order to infer soot loading within the diesel particulate filter.

The sensor may determine an attenuation value for each of a plurality of radio frequencies between a minimum radio frequency value and a maximum frequency value. The sensor may also provide an average attenuation value of the attenuation values for the plurality of radio frequencies. The sensor may further provide standard deviation data in relation to the average attenuation value.

The processor that receives data from the sensor may use the average attenuation value, the standard deviation data and the maximum and minimum frequency values received from the sensor in order to infer the soot loading. In this way, the amount of data provided by the sensor is significantly less than the complete data set of all attenuation values, one for each of the plurality of radio frequencies between the minimum radio frequency value and the maximum frequency value. This may save considerable bandwidth in the transfer of data between the sensor and the processor as well as considerable processing capacity in the processor.

The nature of the system is such that, for certain radio frequencies, there may be resonant affects that result in significant attenuation. This significant attenuation at certain frequencies may influence the average attenuation value to an extent that means the capacity for inferring the soot loading in the diesel particulate filter may be compromised.

It may be undesirable for the processor to scrutinise large quantities of raw radio frequency attenuation data in place of average, minimum, maximum and standard deviation data. In any case, it may be that to be able to provide such data would require a significantly more complex sensor involving a higher hardware cost, as well as greater bandwidth for the transfer of the data between the sensor and the processor.

SUMMARY OF THE DISCLOSURE

Against this background there is provided a method of using a radio frequency sensor for determining an estimate of soot load in a diesel particulate filter, the method comprising:
receiving a first mean attenuation value derived from attenuation values for each of a first plurality of radio frequencies within a first band of radio frequencies;
receiving first standard deviation data for the mean attenuation value relating to the first plurality of radio frequencies within the first band of radio frequencies;
determining whether the standard deviation data exceeds a standard deviation threshold;
(a) in the event that the standard deviation data does not exceed a standard deviation threshold:
using the first mean attenuation value to infer a value for soot load in the diesel particulate filter;
(b) in the event that the standard deviation data exceeds a standard deviation threshold:
receiving a second mean attenuation value derived from attenuation values for each of a second plurality of radio frequencies within a second band of radio frequencies;
receiving second standard deviation data relating to the mean attenuation value for a second plurality of radio frequencies within the second band of radio frequencies; and
in the event that the second standard deviation data does not exceed the standard deviation threshold:
using the second mean attenuation value to infer the value for soot load in the diesel particulate filter.

DETAILED DESCRIPTION

Figure 1:
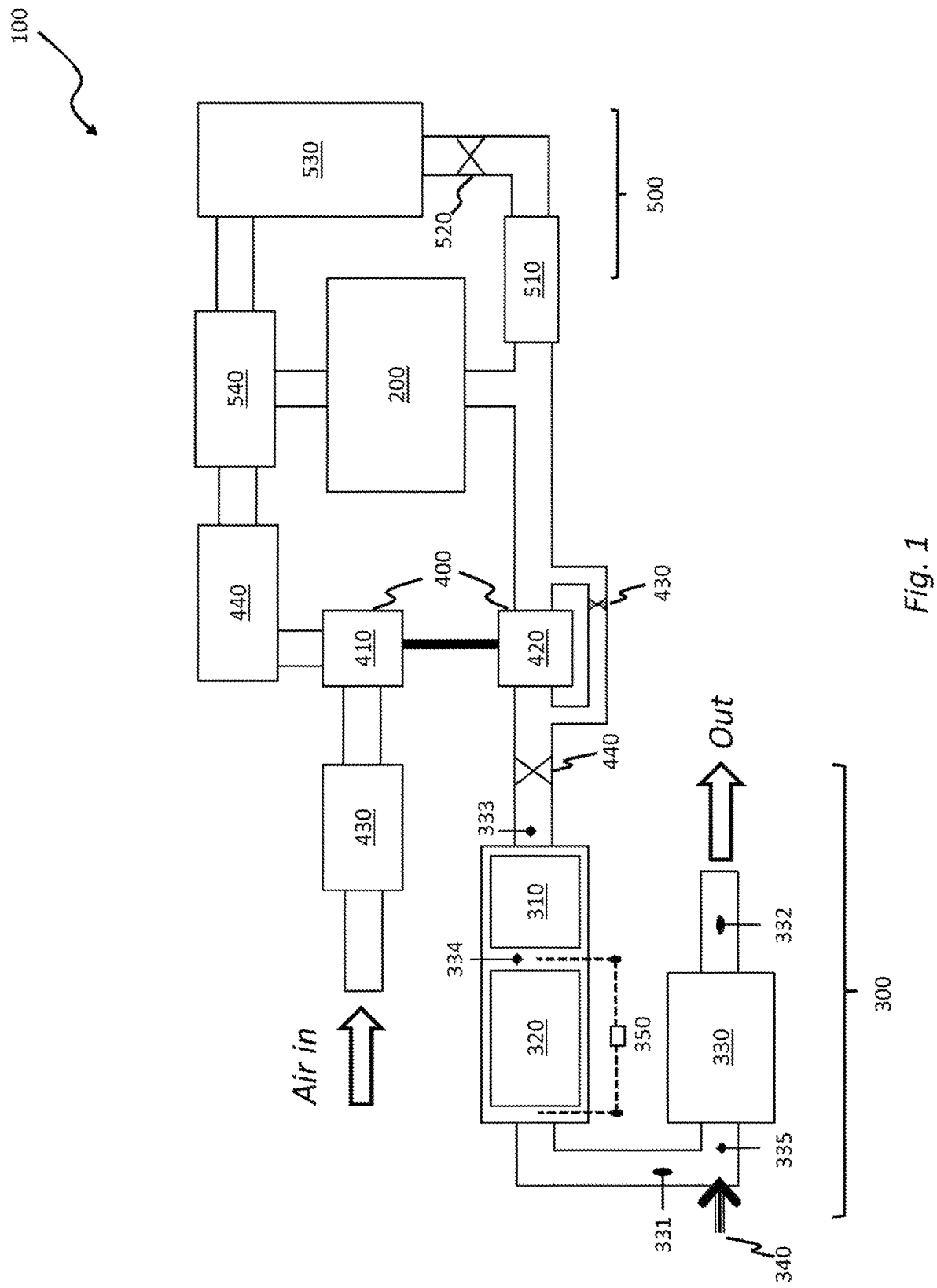
FIG. 1 shows an engine assembly comprising an internal combustion engine and an aftertreatment apparatus for use with the method of the present disclosure.

A hardware arrangement of an engine assembly 100 comprising an internal combustion engine 200 and an aftertreatment apparatus 300 comprising a radio frequency soot sensor 350 for use in accordance with the method of the disclosure is shown in FIG. 1.

In addition to the internal combustion engine and the aftertreatment apparatus, the engine assembly 100 may further comprise a turbocharger 400, and an exhaust gas recirculation circuit 500.

The exhaust gas recirculation circuit comprises an EGR pre-cooler 510, and EGR valve 520, an EGR cooler 530 and an EGR mixer 540.

The internal combustion engine 200 may comprise a combustion chamber in which fuel may combust with air in order to generate kinetic energy. Air may be provided to the combustion chamber via an air cleaner (filter) 430, a compressor 410 of the turbocharger 400, an air cooler 440 and the exhaust gas recirculation mixer 540 of the exhaust gas recirculation circuit 500.

Exhaust gas resulting from combustion in the combustion chamber may, at least in part, be recirculated via the exhaust gas recirculation circuit 500 to the exhaust gas recirculation mixer 510 such that it may be passed back through the combustion chamber in combination with air from compressor 410 of the turbocharger 400. The exhaust gas recirculation valve 520 may control flow through the exhaust gas recirculation circuit 500.

A second portion of the exhaust gas resulting from combustion in the combustion chamber may pass through the turbine of the turbocharger 420. An electronic wastegate 430 may control a bypass route by which flow may selectively bypass the turbocharger turbine 420. An exhaust backpressure valve 440 may be located downstream of the turbine 420.

The aftertreatment apparatus 300 may comprise a diesel oxidation catalyst module 310 comprising a diesel oxidation catalyst, a diesel particulate filter module 320 comprising a diesel particulate filter and a selective catalytic reduction module 330 comprising a selective reduction catalyst. An injector 340 may be located upstream of the selective reduction catalyst module 330 to provide a reductant to facilitate appropriate reactions with oxides of nitrogen ($NO_x$). $NO_x$ sensors 331, 332 may be provided both upstream of and downstream of the selective catalytic reduction module.

Of particular relevance to the method of the present disclosure is the radio frequency soot sensor 350 that is associated with the diesel particulate filter module 320. The radio frequency soot sensor 350 may comprise an antenna and a receiver. The antenna and the receiver may be located with a gap therebetween. The gap may be between an upstream end and a downstream end of the diesel particulate filter 320 or may be between opposite sides of a diesel particulate filter 320. The relative location of the antenna and receiver may influence the data provided by the radio frequency soot sensor 350, including in the absence of soot within the diesel particulate filter 320. Data provided by the radio frequency soot sensor 350 may also be influenced by the geometry of the diesel particulate filter 320.

In some embodiments, further sensors may be provided. For example, there may be provided: a diesel oxidation catalyst module inlet temperature sensor 333; a diesel particulate filter inlet temperature sensor 334; and a selective catalytic reduction module inlet temperature sensor 335. Other sensors may also be provided.

Figure 2:
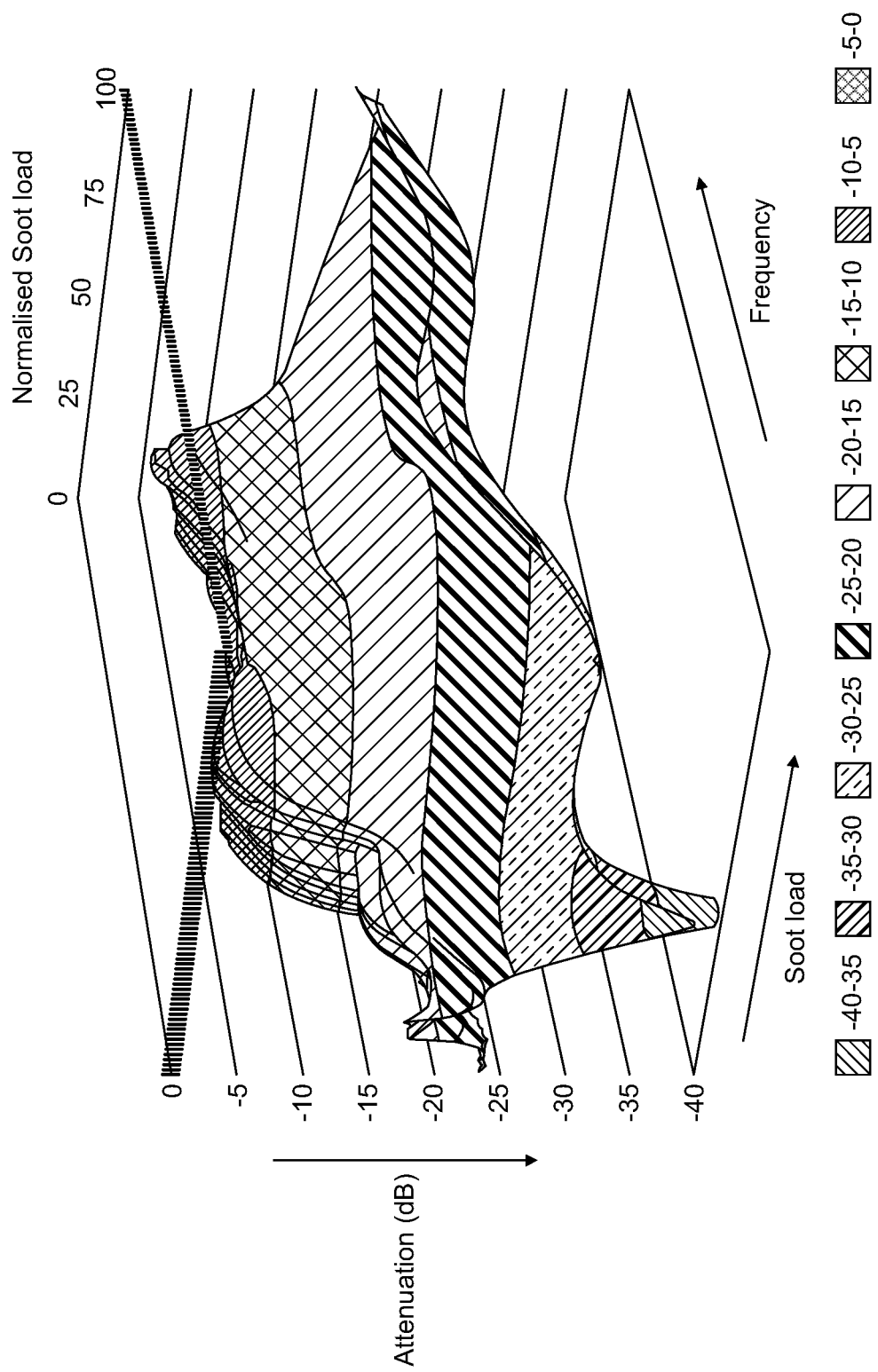
FIG. 2 shows a three dimensional graphical representation of radio frequency attenuation data against frequency and soot load.

FIG. 2 shows raw measured attenuation data plotted against radio frequency value and soot load as a three-dimensional hypersurface for a particular hardware arrangement. It should be noted that attenuation data is influenced by more factors that are shown in the FIG. 2 plot. For example, temperature may have a significant influence on the attenuation data. For simplicity, and since it is not possible to show an additional dimension in a graphical format such as that of FIG. 2, the influence of temperature is not shown in the data of FIG. 2. Rather, the data of FIG. 2 is for a particular temperature. Accordingly, there may be equivalents of the FIG. 2 plot for different temperatures. In one arrangement, there may be a different FIG. 2 plot for each temperature obtainable from the diesel particulate filter inlet temperature sensor 334. The measured temperature obtained from the diesel particulate filter inlet temperature sensor 334 may be used to determine which of a range of FIG. 2 plots is used as part of the method according to the disclosure.

It can be seen from data of FIG. 2 that, even with no soot load, attenuation varies with frequency. In the FIG. 2 data, there is a trend that the attenuation is generally greater at lower frequencies across the full soot load spectrum. That said, the relationship between attenuation and soot load is complex in this example data set, as in other observed data sets. This may be attributed at least in part to the geometry of the diesel particulate filter module 320.

The range of attenuation values in the FIG. 2 data set is between roughly −5 dB and −25 dB. In one specific region, however, at low frequency and for a particular subset of normalised soot load values, the attenuation increases extremely rapidly. This may be a result of resonant effects. The rapid drop in attenuation appears to resemble a sinkhole in the hypersurface. This disclosure refers to a sinkhole for clarity of explanation only. The sinkhole nomenclature is merely a label and does not imply any numerically defined features, just a pronounced and sudden increase in attenuation for particular frequencies at particular soot loadings. Multiple sink holes may be present. The number and size of the sinkhole or sinkholes may be dependent upon a range of variables, including hardware geometry.

Attenuation values in the vicinity of a sinkhole are likely to be attributable to resonance effects that do not provide meaningful insight into the soot load.

Since the full data set may not be output by the radio frequency soot sensor 350 (or, even if it is output by the sensor 350, may not be interpretable by the engine control module) the existence of the sinkhole may not be immediately evident. That said, the effect of the sinkhole on the data that is output by the radio frequency soot sensor 350 may be considerable.

More specifically, a sinkhole feature may have a significant and unhelpful effect on average attenuation data that may mask ability of the engine control module to infer soot load. A sinkhole feature may also have significant effect on standard deviation attenuation data.

The present disclosure relates to a method for mitigating the effects of sinkhole behaviour in the hypersurface.

In one arrangement, the engine control module receives data in respect of a radio frequency sweep at set time intervals. The frequency sweep may initially correspond to a first band of radio frequencies. The data received at each time interval may include mean attenuation value and standard deviation attenuation value. For a particular soot load, the mean attenuation value effectively corresponds to the average value of a two-dimensional line through the hyperspace and the standard deviation value is a standard deviation for those values.

The method may include comparing standard deviation attenuation data with a standard deviation threshold. The standard deviation threshold for a particular embodiment may be calibrated to identify the likely presence of a sinkhole.

Figure 3:
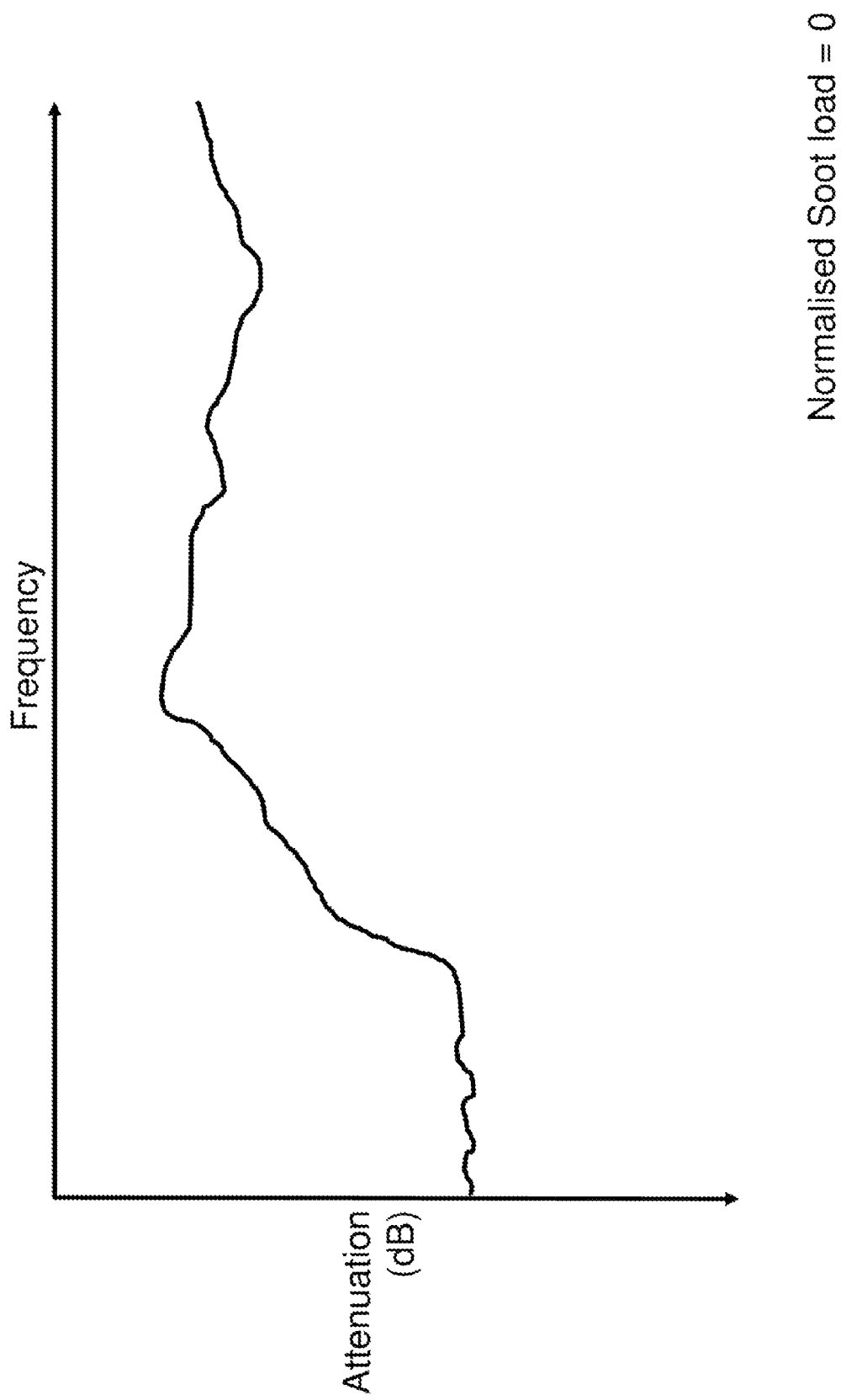
FIG. 3 shows a plot of attenuation against frequency for a normalised soot load of zero.
Figure 4:
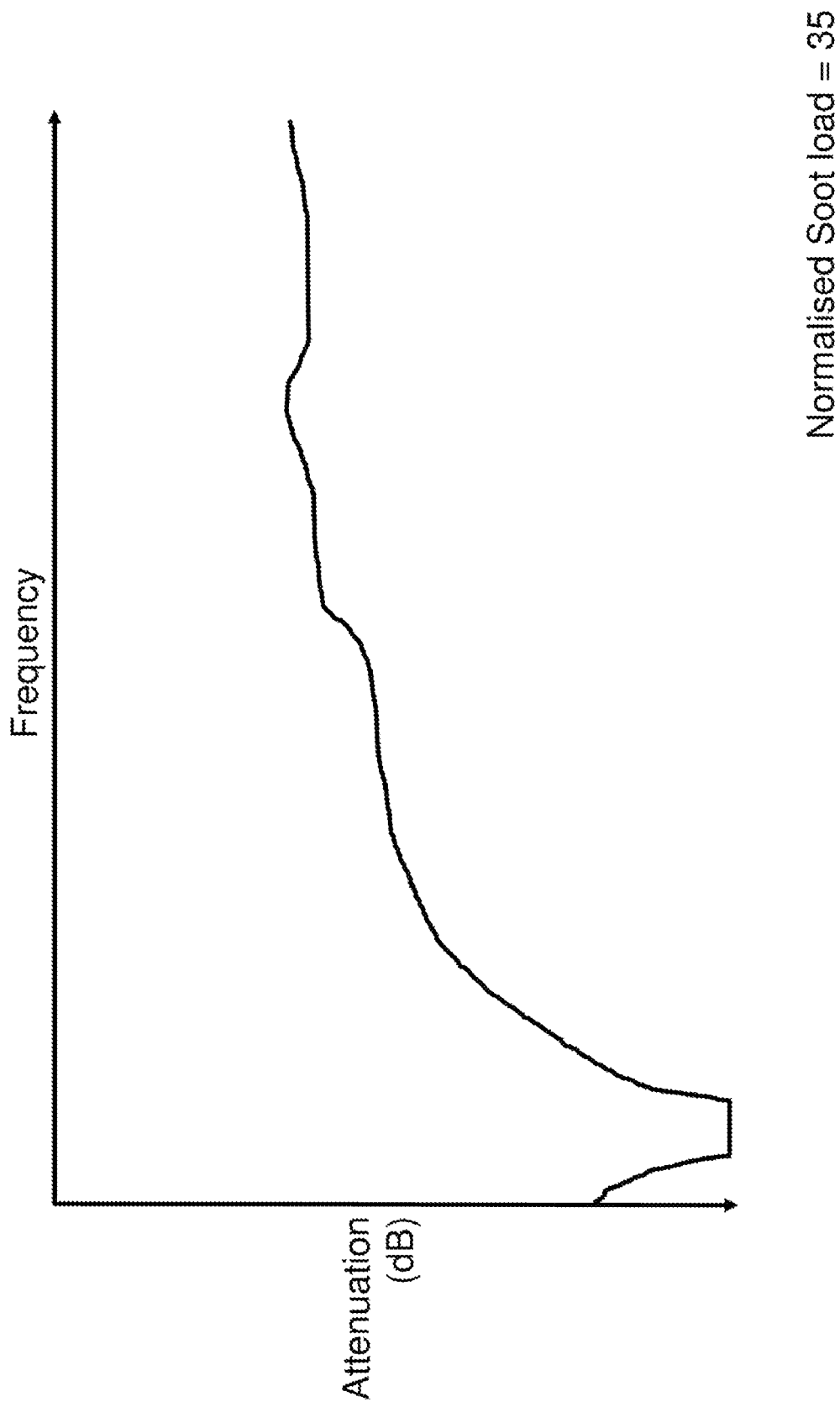
FIG. 4 shows a plot of attenuation against frequency for a normalised soot load of 35.
Figure 5:
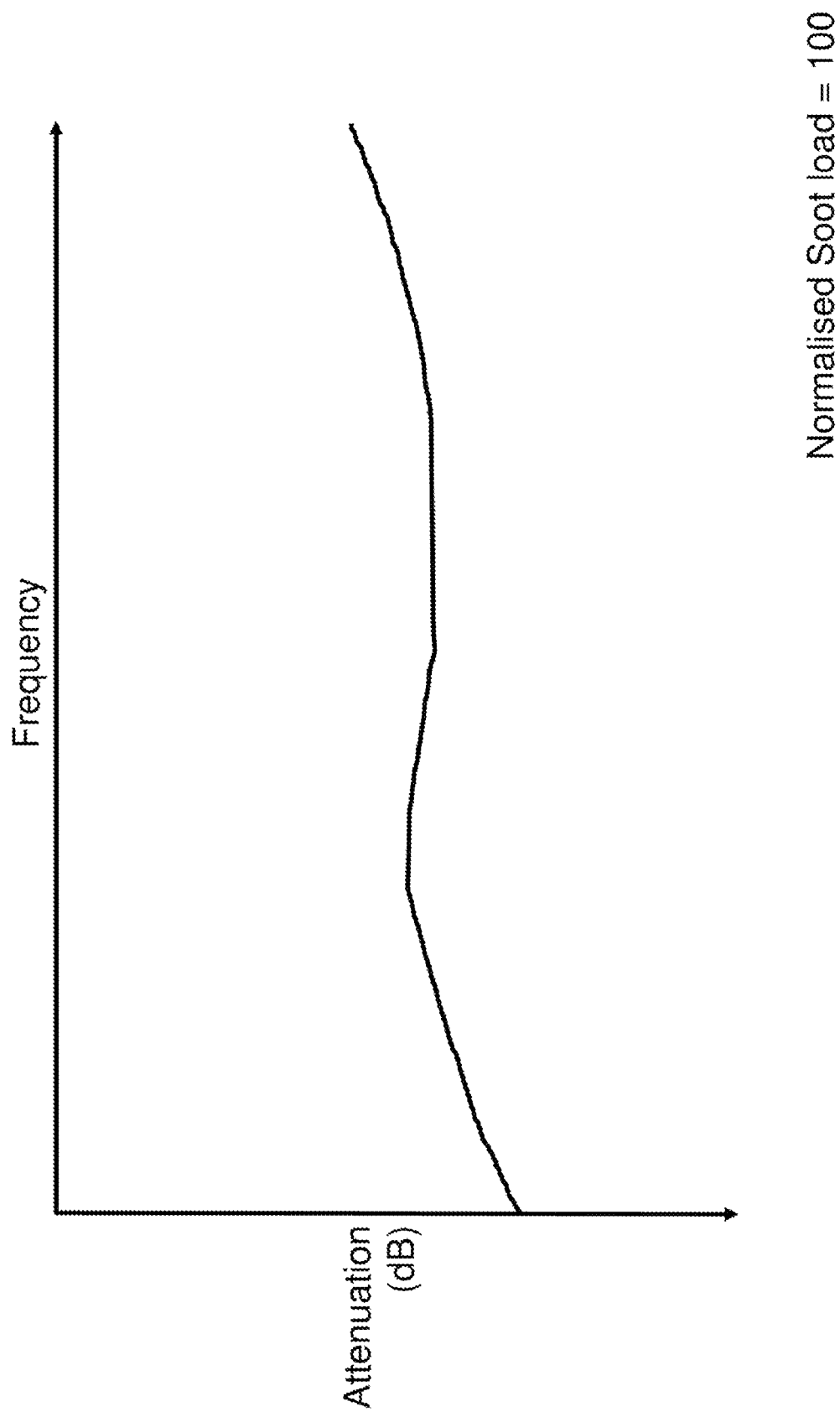
FIG. 5 shows a plot of attenuation against frequency for a normalised soot load of 100.

FIGS. 3, 4 and 5 each show a two-dimensional line through a hypersurface presentative of the relationship between attenuation and frequency for different normalised soot loads.

The data provided by the radio frequency soot sensor 350 may be the mean attenuation, the standard deviation and the minimum and maximum frequencies. Accordingly, the presence and location of a sinkhole (as present in the FIG. 4 data set) may not be immediately self-evident.

In accordance with the method of the disclosure, the standard deviation attenuation value may be compared with a threshold standard deviation attenuation value.

Where the standard deviation attenuation value does not exceed the threshold standard deviation attenuation value it may be inferred that no sinkhole is present. Accordingly, the correspondence between, on the one hand, the mean attenuation and the standard deviation attenuation and, on the other hand, the soot load, can be inferred by the processor—potentially a constituent of an engine management system—that receives data from the sensor.

Where the standard deviation attenuation value exceeds the threshold standard deviation attenuation value it may be inferred that a soot hole is present. In these circumstances, it may be that the processor infers that a sinkhole is present.

In such circumstances, the processor may send a signal to the sensor to conduct a second (or subsequent) radio frequency sweep that correspond to a second band of radio frequencies that avoids a first subset of frequencies that are in the likely vicinity of the sinkhole. The first subset of frequencies may be avoided in a number of ways. For example, the first subset of frequencies may be avoided by excluding a particular band of frequencies within the first band of radio frequencies. Alternatively, it may be achieved by shifting the band of frequencies towards higher frequencies or towards lower frequencies. Any technique by which the frequencies in question may be avoided may be appropriate. In the example of the FIG. 4 data set, the frequencies that may be excluded may be those at the lowest 10% of frequency values of the frequency sweep.

Data provided by the second frequency sweep may then be assessed by the processor to see if the standard deviation attenuation data exceeds the threshold. Where the threshold is not exceeded, it may be inferred that the data no longer includes that relating to the sinkhole. Where the threshold is exceeded, it may be inferred that the data still includes at least some of that relating to the sinkhole.

The process may then be repeated whereby a further radio frequency sweep may be conducted avoiding a second subset of frequencies. The second subset of frequencies may constitute a simple shift relative to the first subset of frequencies. In an alternative, the second subset of frequencies may fall between the same minimum and maximum frequencies but may exclude some frequencies therebetween. This may be termed a bandstop frequency region. In a still further alternative, the second subset of frequencies my result from any combination of a shift, a narrowing and band stop. The process may be repeated sufficient times in order to achieve a standard deviation value that falls below the threshold value.

The band stop frequency region may cover a minimum range of frequencies that result in the standard deviation data exceeding the standard deviation threshold.

In the event that the standard deviation data exceeds the standard deviation threshold, position of the band stop frequency region may be shifted incrementally to a minimum extent necessary to result in the standard deviation data falling within the standard deviation threshold.

The position of the band stop frequency region may be shifted towards higher frequencies or towards the lower frequencies.

In the event that the standard deviation data exceeds the standard deviation threshold, width of the band stop frequency region may increase incrementally to a minimum extent necessary to result in the standard deviation data falling within the standard deviation threshold.

Feed-forward control logic may be employed to shift the band stop frequency region in tandem with the shifting of the frequencies that result in high standard deviations.

The first mean attenuation value, the first standard deviation data, the second mean attenuation value and the second standard deviation data may be provided by a radio frequency sensor. The method may comprise providing instructions defining the second band of radio frequencies to the sensor.

The method of the disclosure may be performed in a continuous loop.

In this way, significantly more accurate soot load data can be inferred without requiring additional data than mean attenuation, standard deviation of attenuation and frequencies included within the frequency sweep.

By providing the processor with data that defines at least some of the features of an expected hyperspace for a particular diesel particulate filter geometry and engine parameters, it may be that the processor is able to infer the likely progress of a sinkhole (or a plurality of sinkholes) as soot load increases. In this way, the movement of the subset of frequencies that are to be avoided is not arbitrary. Rather, the likely direction of movement of the sinkhole may be used to inform a preliminary subset of frequencies to be avoided as part of the method of the present disclosure.

In some embodiments, feed forward control logic may be used to seek to avoid the frequencies likely to result in sinkhole effects.

It may be that the typical hyperspace for a particular hardware arrangement changes with age of the device on account of factors other than soot load. Other factors may include ash build up in the diesel particulate filter. Other factors may also include changes in geometry of the passage through the diesel particulate filter (due, for example, to soot and ash loading). These may influence fluid flow behaviour through the diesel particulate filter which also may have an impact on the hyperspace. Some factors (e.g. temperature) may have a short term effect on a particular hyperspace, some factors may have a medium term effect on a particular hyperspace, while other factors may have a long term effect on a particular hyperspace.

Accordingly, the location of a particular sinkhole relative to soot load may change over a lifetime of the device on account of these additional factors. The method of the disclosure recognises this evolution and the method seeks to identify and mitigate actual impact of the sinkhole rather than simply those frequencies that would expect to be affected by the said sinkhole when the hardware is new and ageing effects have not yet begun to have an impact. In this way, the method may be dynamic with time as well as with soot load.

Furthermore, for two new diesel particulate filter modules having the same specification, an actual hyperspace for one may not be identical to a corresponding actual hyperspace for the other. This may be attributable to standard manufacturing variations. The feedback attributes of the method of the present disclosure enable the method to adjust relatively quickly to accommodate such variations, as well as to accommodate both short and longer term variations attributable to use.

As such, the method may involve short, medium and long term feed forward control logic.

INDUSTRIAL APPLICABILITY

In this way, it may be possible for the method to recognise when a baseline hyperspace (in the absence of soot load effects) changes due to other (e.g. long term) variables and compensates dynamically for such effects. For example, the method may recognise a modest creep in the hyperspace and mitigate for the same. This may include re-baselining when the DPF is thought to be in a known condition (e.g. after an extended regeneration), or revising the used frequency range based on an estimate of ash accumulation.

The ability of the method to seek changes to the scope of the data (e.g. by excluding certain frequencies from the frequency sweep) both in the relatively short term as well as in the longer term, give rise to the possibility of detaching the specifics of the sensor hardware and operation from the specifics of a particular hardware configuration, not least since the method allows the sensor operation to be adapted and to evolve dependent upon hardware and conditions. This, in turn, may enable a single physical radio frequency soot sensor to be purchased for a wider range of diesel particulate filter sizes. Diesel particular filter size specific calibration may be part of the information used by the engine control module to infer hyperspace characteristics used in accordance with the model of the disclosure.

In addition to diesel particulate filter size and shape considerations, part to part variability, and longer hour effects (e.g. ash accumulation), which may influence the baseline frequency response of the system, can be determined and compensations of the model used to render more accurate soot load estimates.

The invention claimed is:

1. An engine assembly for determining an estimate of soot load in a diesel particulate filter of the engine assembly, the engine assembly comprising an engine control module and a radio frequency soot sensor, the engine control module configured to:
   receive a first mean attenuation value derived from attenuation values for each of a first plurality of radio frequencies within a first band of radio frequencies detected by the radio frequency sensor;
   receive first standard deviation data for the mean attenuation value relating to the first plurality of radio frequencies within the first band of radio frequencies;
   determine whether the first standard deviation data exceeds a standard deviation threshold;
   (a) in the event that the first standard deviation data does not exceed the standard deviation threshold:
use the first mean attenuation value to infer a value for soot load in the diesel particulate filter;
   (b) in the event that the first standard deviation data exceeds the standard deviation threshold:
receive a second mean attenuation value derived from attenuation values for each of a second plurality of radio frequencies within a second band of radio frequencies;
receive second standard deviation data relating to the mean attenuation value for a second plurality of radio frequencies within the second band of radio frequencies detected by the radio frequency sensor; and
in the event that the second standard deviation data does not exceed the standard deviation threshold:
use the second mean attenuation value to infer the value for soot load in the diesel particulate filter.

2. The engine assembly of claim 1, wherein the second band of radio frequencies forms a subset of the first band of radio frequencies.

3. The engine assembly of claim 1, wherein second band of radio frequencies comprises a lower band and an upper band, wherein the lower band is separated from the upper band by a band stop frequency region.

4. The engine assembly of claim 3, wherein the band stop frequency region covers a minimum range of frequencies that result in the standard deviation data exceeding the standard deviation threshold.

5. The engine assembly of claim 3 wherein in the event that the standard deviation data exceeds the standard deviation threshold, position of the band stop frequency region is shifted incrementally to a minimum extent necessary to result in the standard deviation data falling within the standard deviation threshold.

6. The engine assembly of claim 5, wherein the position of the band stop frequency region is shifted towards higher frequencies.

7. The engine assembly of claim 5, wherein the position of the band stop frequency region is shifted towards lower frequencies.

8. The engine assembly of claim 3, wherein in the event that the standard deviation data exceeds the standard deviation threshold, width of the band stop frequency region increases incrementally to a minimum extent necessary to result in the standard deviation data falling within the standard deviation threshold.

9. The engine assembly of claim 3, and further comprising: employing feed-forward control logic to shift the band stop frequency region in tandem with the shifting of the frequencies that result in high standard deviations.

10. The engine assembly of claim 1, wherein the first mean attenuation value, the first standard deviation data, the second mean attenuation value and the second standard deviation data are provided by a radio frequency sensor, wherein the method further comprises:
   providing instructions defining the second band of radio frequencies to the sensor.

11. The engine assembly of claim 1, wherein the the determining the estimate of soot load is performed in a continuous loop.

12. The engine assembly of claim 1 further comprising long term feed forward control logic in order to compensate for slow shifts in behaviour over time.

13. The engine assembly of claim 1 wherein the use of the first or second mean attenuation value to infer the value for soot load in the diesel particulate filter includes reference to a value for temperature of the diesel particulate filter.

14. The engine assembly of claim 1, further comprising an internal combustion engine and an aftertreatment apparatus, the radio frequency soot sensor configured for providing radio frequency data in relation to the aftertreatment apparatus.

* * * * *